July 4, 1967
C. B. HOPPE
3,328,876
SURGICAL SUTURE EXTRACTOR
Filed Oct. 27, 1964
7 Sheets-Sheet 5
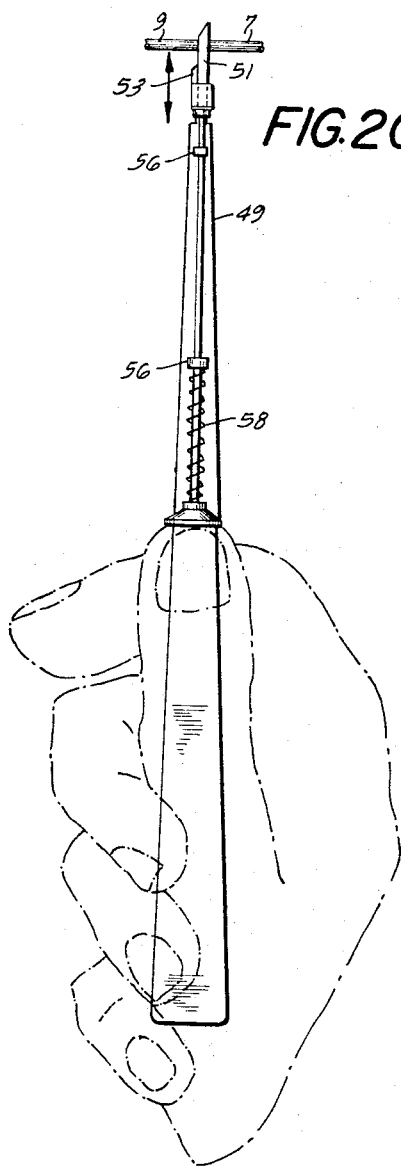
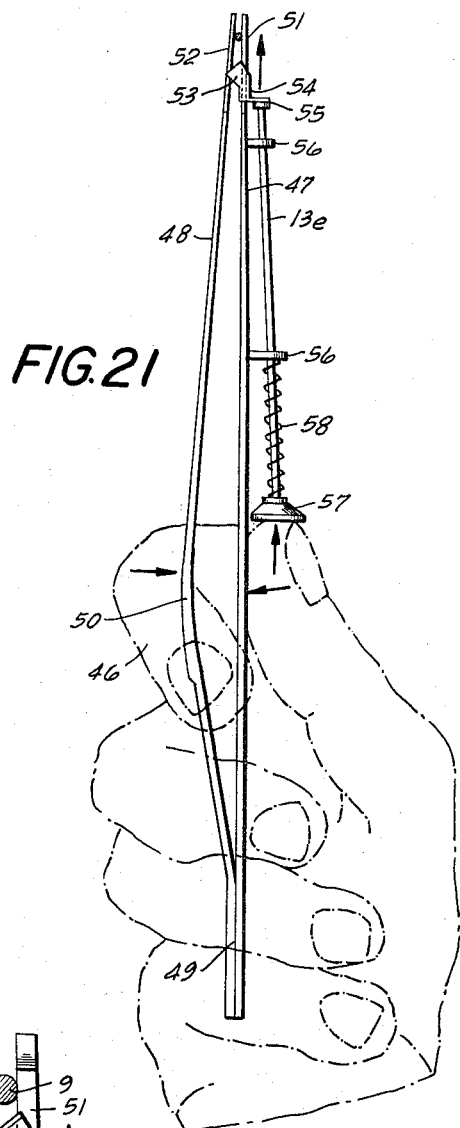
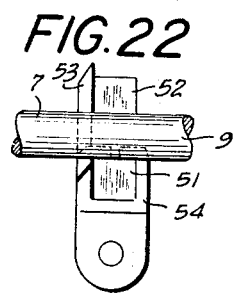
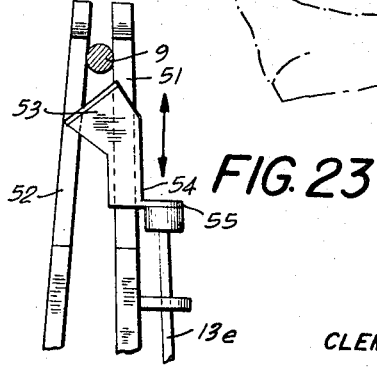
INVENTOR.
CLEMENS B. HOPPE
BY
Pennie, Edmonds, Morton, Taylor & Adams
ATTORNEYS

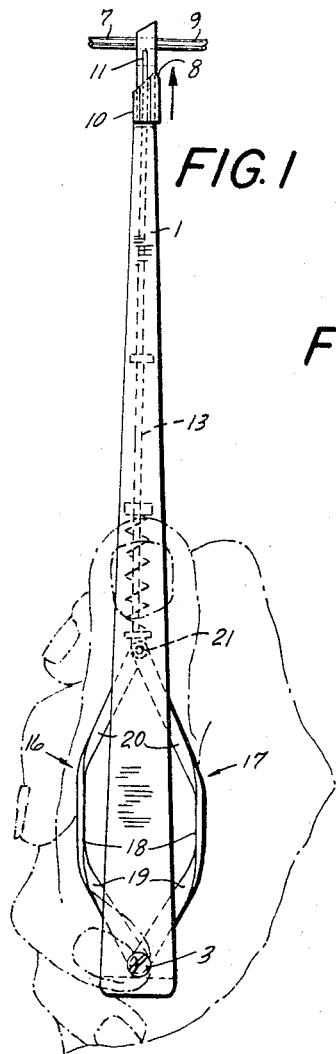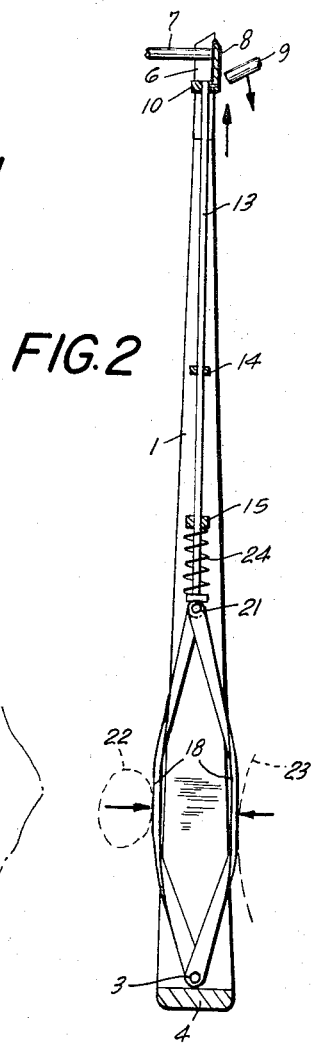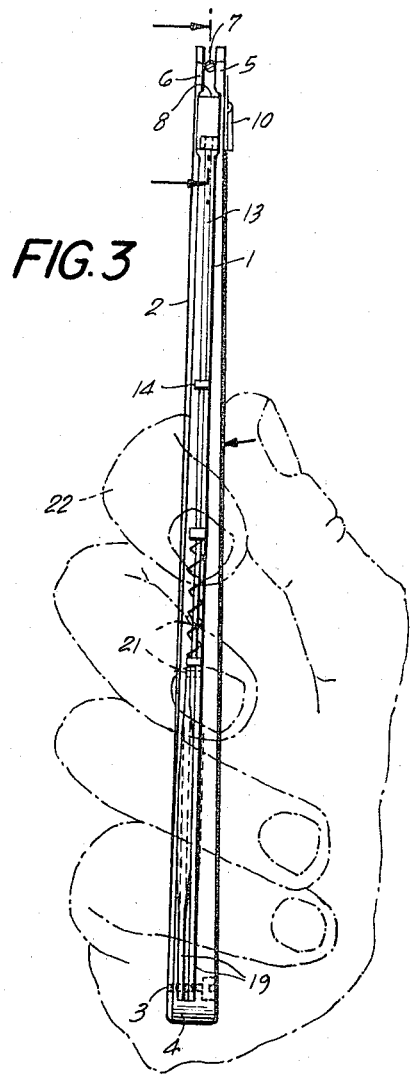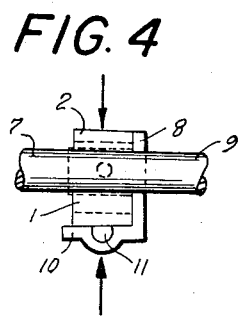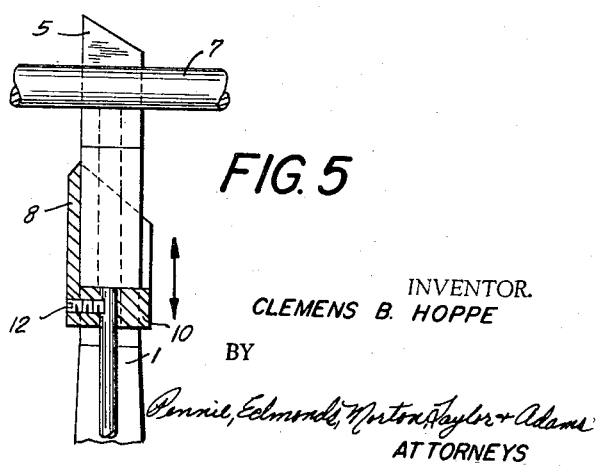
INVENTOR.
CLEMENS B. HOPPE
ATTORNEYS July 4, 1967  C. B. HOPPE  3,328,876
SURGICAL SUTURE EXTRACTOR
Filed Oct. 27, 1964  7 Sheets-Sheet 2
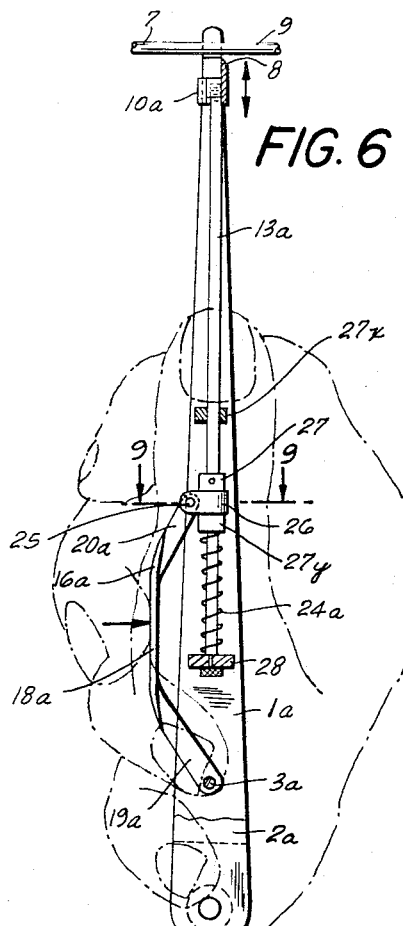
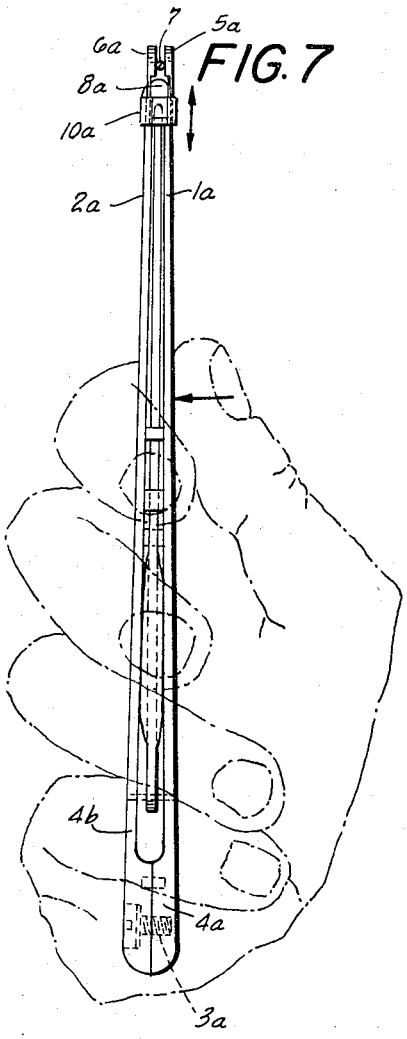
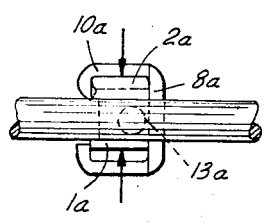
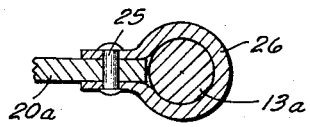
INVENTOR.
CLEMENS B. HOPPE
BY
*Pennie, Edmonds, Morton Taylor & Adams*
ATTORNEYS

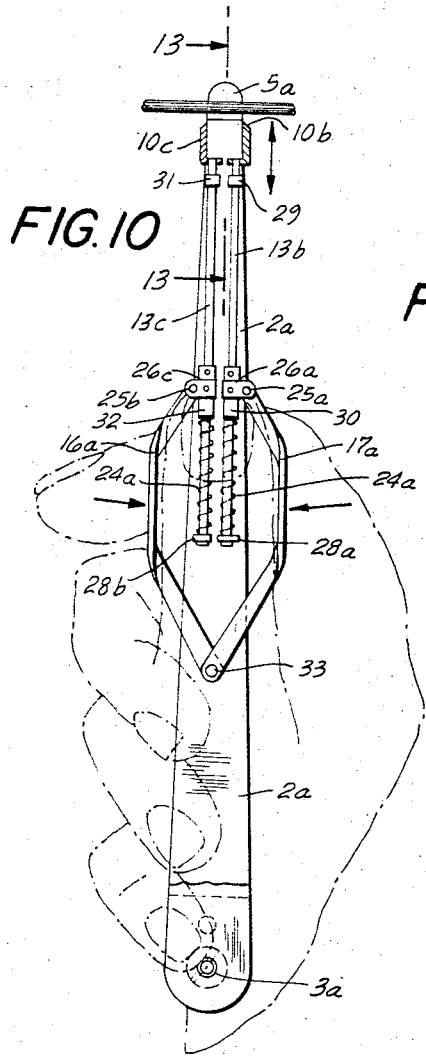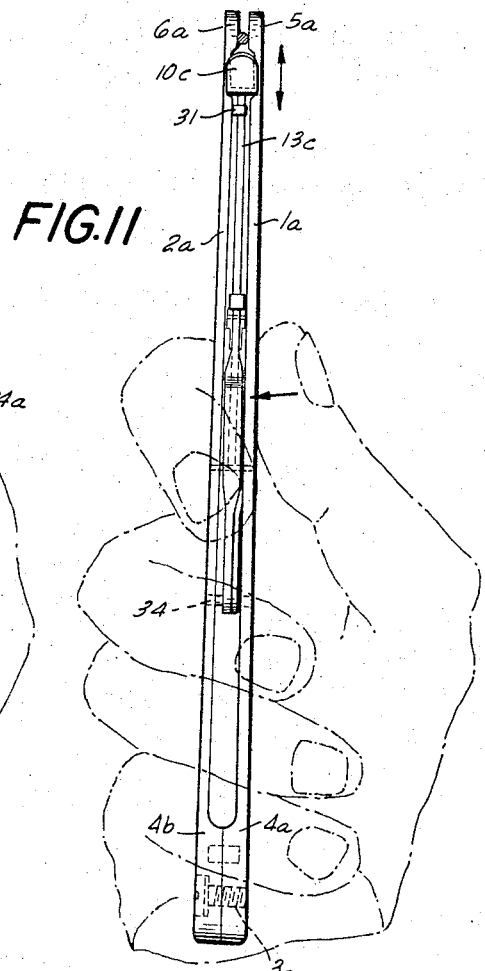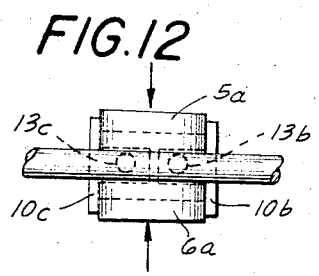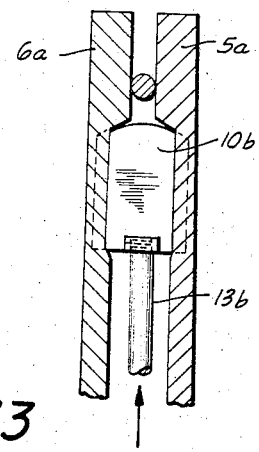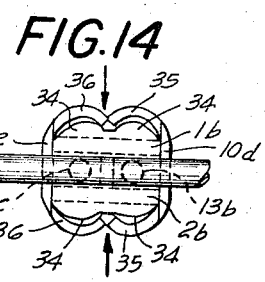
INVENTOR.
CLEMENS B. HOPPE
ATTORNEYS

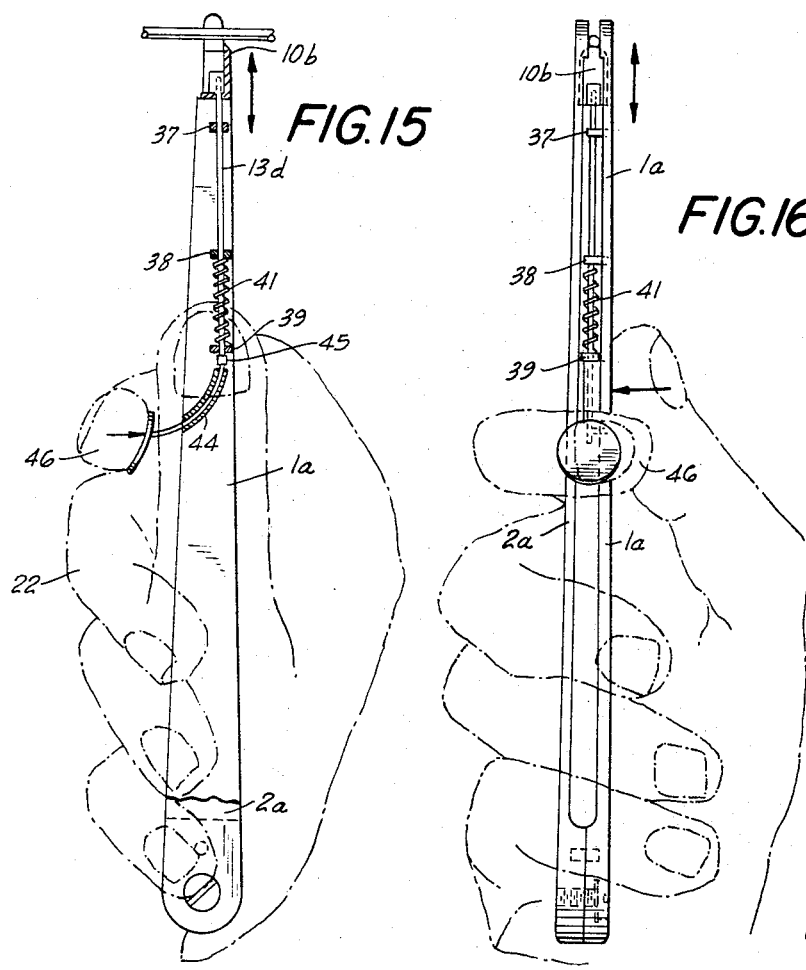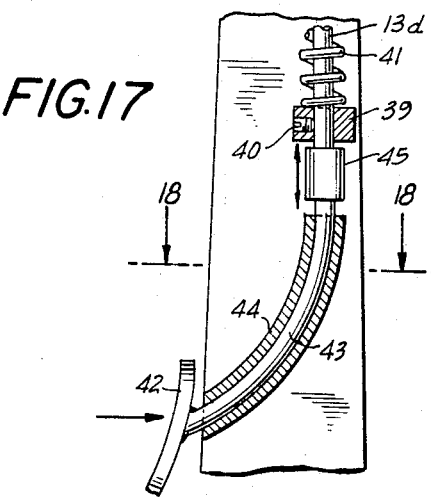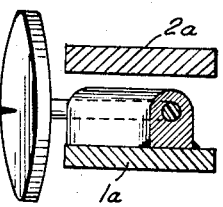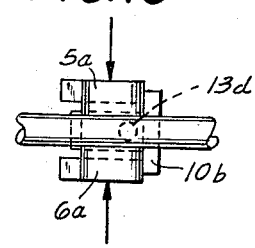

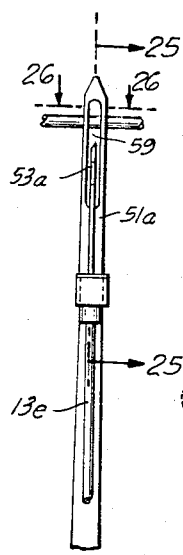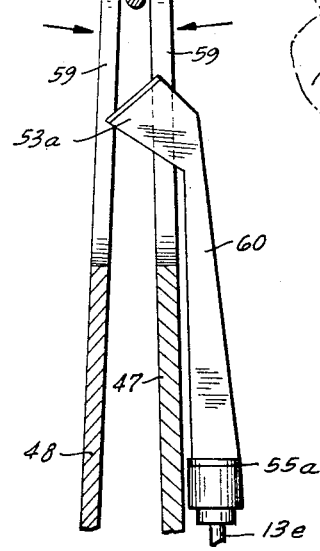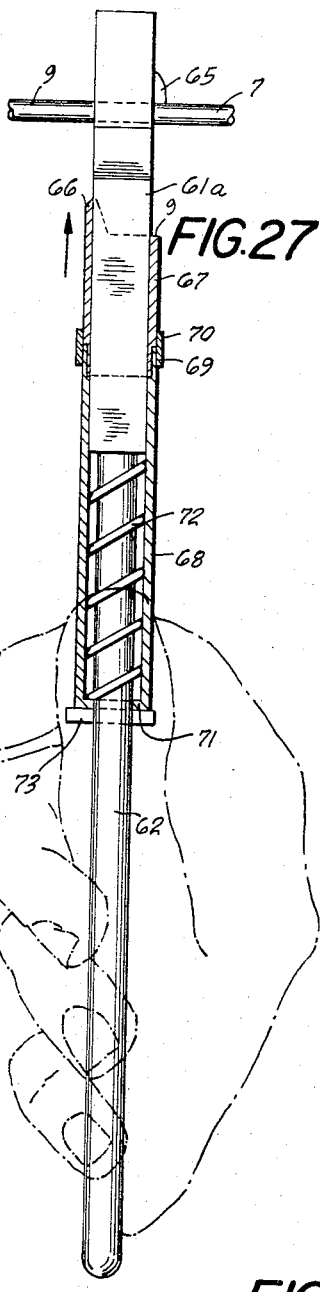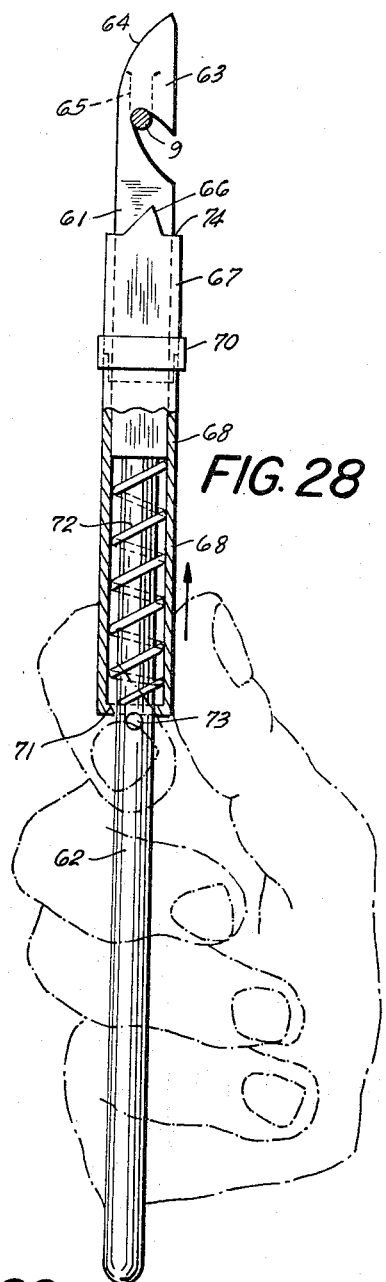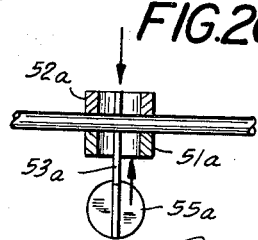
INVENTOR.
CLEMENS B. HOPPE

July 4, 1967  C. B. HOPPE  3,328,876
SURGICAL SUTURE EXTRACTOR
Filed Oct. 27, 1964  7 Sheets-Sheet 7

INVENTOR.
CLEMENS B. HOPPE
BY
Pennie, Edmonds, Morton, Taylor Adams
ATTORNEYS

United States Patent Office 3,328,876
Patented July 4, 1967

3,328,876
SURGICAL SUTURE EXTRACTOR
Clemens B. Hoppe, P.O. Box 590,
Palm Beach, Fla. 33480
Filed Oct. 27, 1964, Ser. No. 406,861
10 Claims. (Cl. 30—124)

This invention relates to instruments for removing sutures and more particularly to a device to be used by surgeons to facilitate the lifting of sutures after they have been cut. More especially the invention relates to an improved device for severing a suture and substantially simultaneously gripping the cut-off thread or stitch so that it can be removed in substantially a single motion of the surgeon's hand.

In accordance with the invention the instrument comprises a slender elongated device which may be in the form of a single slender arm or in the form of a tweezers, in either case however having means at its outer or operating end for engaging and holding a suture, together with a knife arranged to be slidable adjacent the operating end of the device, and means near the grasping portion of the device operable by the hand including one or more of the fingers for causing the knife to slide forward and sever the suture close to the point where it is engaged and held at the outer end of the device.

The invention includes a number of forms of embodiment and it will be better understood from a consideration of the accompanying drawings showing these various embodiments and also from the detailed description following. In these drawings:

FIGS. 1-5 illustrate a tweezer type device embodying the invention, FIG. 1 being a side view, FIG. 2 a longitudinal section, FIG. 3 a side view looking from the left in FIG. 1, FIG. 4 an end view from the top in FIG. 1 and FIG. 5 a detailed section taken on line 5—5 of FIG. 3;

FIGS. 6-9 show a modification in which FIG. 6 is a sectional view with one of the tweezer blades broken away, FIG. 7 a side view showing both tweezer blades, FIG. 8 an end view from the top of FIG. 6, FIG. 9 a detailed cross-section taken on line 9—9 of FIG. 6;

FIGS. 10-14 show another modification, FIG. 10 being a side view similar to FIG. 1, FIG. 11 a side view at right angles looking from the left of FIG. 10, FIG. 12 being an end view from the top of FIG. 10, FIG. 13 being a detailed section on line 13—13 of FIG. 10, and FIG. 14 is a view similar to FIG. 12 showing a modified form of blade and knife;

FIGS. 15-19 illustrate a further modification, FIG. 15 being a sectional view similar to FIG. 6 with one of the tweezer blades broken away, FIG. 16 being a side view showing both eweezer blades, FIG. 17 being an enlarged fragmentary view showing a part of the mechanism in detail, FIG. 18 being a section taken on line 18—18 of FIG. 17 and FIG. 19 being an end view looking from the top of FIG. 16;

FIGS. 20-23 show still another modification, FIG. 20 showing a side view, FIG. 21 being a side view at right angles to FIG. 20 and looking from the left of that figure; FIG. 22 being an end view looking from the top of FIG. 20 and FIG. 23 being an enlarged fragmentary view of the outer portion of the parts shown in FIG. 21;

FIGS. 24-26 show another modification similar to that of FIGS. 20-23, FIG. 24 being a side view of the upper end portion of the device, FIG. 25 a sectional view taken on line 25—25 of FIG. 24 and drawn to a larger scale, and FIG. 26 being an end view from the top of FIG. 24;

FIGS. 27 and 28 show still another modification, FIG. 27 being a side view with the movable part shown in section, and FIG. 28 being a side view looking from the left of FIG. 27 and with the movable part broken away and shown in section;

Figure 29:
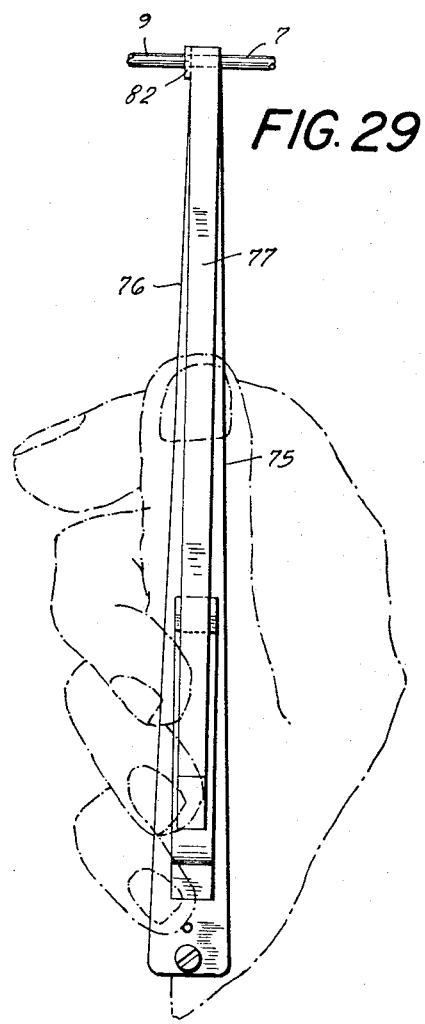
Figure 30:
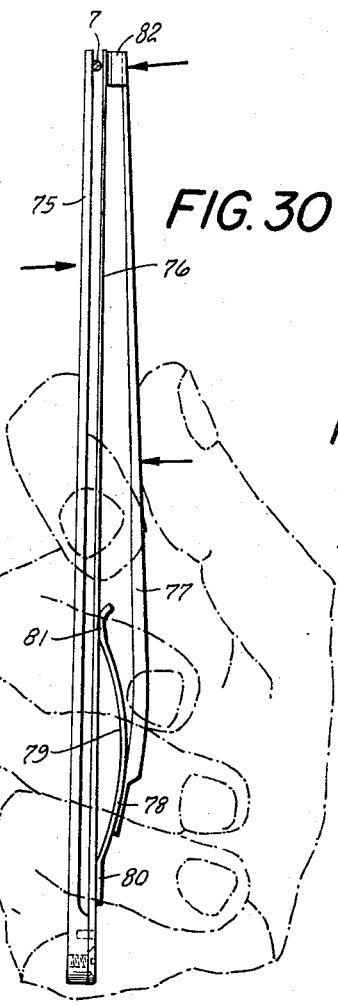
Figure 32:
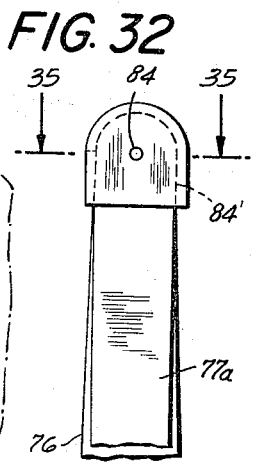
Figure 31:
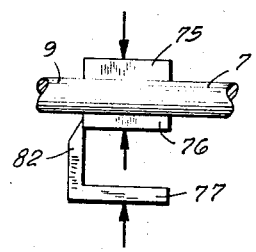
Figure 33:
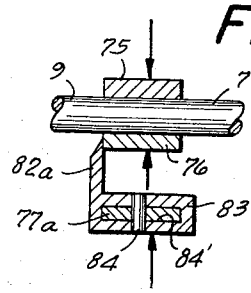

FIGS. 29-31 illustrate another modification, FIG. 29 being a side view, FIG. 30 a side view at right angles to FIG. 29 and viewed from the left thereof, and FIG. 31 being an end view looking from the top of FIG. 29 and FIGS. 32 and 33 illustrate a modified detail of the device of FIGS. 29-31 wherein the knife is arranged to be disposable, FIG. 32 showing in side view the upper end portion of the device, and FIG. 33 being a sectional view taken on line 33—33 of FIG. 32.

Referring now to FIGS. 1-5, the tweezers device here shown comprises two blades 1 and 2, blade 1 being thicker than blade 2 and comparatively rigid. These blades are secured together at their butt ends by means of a screw 3, blade 1 having a lug 4 at its lower end to space the blades apart. The outer, operating end portions or jaws 5 and 6 constitute the gripping area of the device and may be sloped if desired as shown.

The device is arranged to be grasped by the hand of the operator as indicated by the dot and dash lines in FIGS. 1 and 3, whereby the application of squeezing pressure closes the jaws 5 and 6 to grip a suture portion 7 which is to be removed.

A knife 8 to sever the portion 7 from the suture portion 9 which is to remain, is arranged to be slidable closely adjacent the right hand edges of the two blades 1 and 2 and to span the distance between these blades when jaws 5 and 6 have been closed upon the suture.

Knife 8 has a holder, or supporting member 10 at right angles thereto, which is constructed to partially surround a rail 11 which is welded or otherwise secured to the outer surface of jaw 5 so that holder 11 carrying the knife can slide lengthwise of rail 10. Knife 8 may be integral with the holder 10 but advantageously it is removably secured thereto by one or more screws 12 as shown in FIG. 5 so that the blades may be disposable.

Holder 10 and knife 8 are operated by means of an actuating rod 13 which extends lengthwise between the tweezer blades 1 and 2 and is arranged to slide in bearings 14 and 15 which are fixed to one of the blades, for example blade 1.

To operate the actuating rod 13, a pair of symmetrically arranged spring levers 16 and 17 are provided. These levers are alike and each includes a resilient central portion 18 and rigid portions 19 and 20 at the opposite ends thereof. Spring levers 16 and 17 are disposed between the hand-gripping portions of the tweezer blades 1 and 2 located toward the butt end of the device, and the lower rigid portions 19 of the two spring levers are pivoted on screw 3. The opposite lever portions 20 are pivoted at 21 to the adjacent end of the actuating rod 13.

In manipulating the device the operator will squeeze the tweezer blades 1 and 2 between the thumb and fingers to grip the suture, and will then apply one of his fingers, for example, the middle finger 22 to the central resilient portion 18 of one of the spring levers, while the rigid portion 18 of the opposite spring lever engages the palm 23 of the hand. Thus a squeezing pressure is applied which causes the pivot 21 to move away from the fixed pivot 3 and force actuating rod 13 outwardly causing the knife to sever the suture.

The spring levers 16 and 17 are normally held in the expanded position shown in FIG. 1 by the resiliency of the central spring sections 18. Thus, when the pressure on the spring levers is removed, the knife is retracted from the extended position shown in FIG. 2 to the position shown in FIGS. 1 and 3. If desired however, an additional compression coil spring 24 can be placed on actuating rod 13 between the bearing 15 and the ends of the spring fingers 16 and 17 so as to supplement the force of the spring lever sections 18 in retracting the knife.

Referring to the modification shown in FIGS. 6–9, the general arrangement of the device is similar to that shown and described in connection with FIGS. 1–5. The dissimilarities will be pointed out. First of all the blades 1a and 2a are of the same thickness and they have complimentary lugs 4a and 4b at the butt end instead of the lug being all one one of the blades. They are held together by a screw 3a and dowel pin. The jaw portions 5a and 6a have rounded tips as shown in FIG. 6 instead of angular tips. The knife 8 is secured to a U-shaped knife holder 10a having symmetrical arms as shown in FIG. 8 which embrace both of the blades 1a and 2a thus limiting the distance by which these blades can be separated.

This form of the suture extractor has a single, instead of a double, operating spring lever. This single spring lever is shown at 16a, and like the spring levers previously described as a central resilient or spring section 18a, a rigid section 19a and a rigid section 20a. Rigid section 19a is pivoted on screw 3a, and section 20a is pivoted at 25 to a yoke member 26 which surrounds the upper portion of actuating rod 13a. The rod can turn in the yoke and the yoke presses against a collar 27 pinned to rod 13a to move the rod. The rod slides in bearings 27x and 27y fixed to one of the tweezer blades. Bearing 27y serves as a stop. A supplemental coil spring 24a may be used if desired.

The entire knife 8a and knife holder 10a are disposable, the outer end of actuating rod 13a being threaded and received in a threaded aperture in knife holder 10a. The actuating rod is rotated by means of a knurled knob 28 at its opposite end in releasing the old knife and inserting a new one.

In the form of the invention shown in FIGS. 10–14 the construction of the tweezers is identical with that shown and described in connection with FIGS. 6 and 7. Consequently the same reference numerals 1a and 2a are used to indicate the tweezer blades and the lugs 4a and 4b, also the securing screw 3a. In addition the jaws 5a and 6a are identical. The feature of the embodiment shown in FIGS. 10–14 is that two knives 10b and 10c are provided together with an independent operating mechanism for each knife. This enables the operator to sever the suture on either side of the knife. He need not decide which side is to be severed until after the instrument is inserted and the suture gripped.

The knife 10b is supported by actuating rod 13b and knife 10c by rod 13c. These rods slide in bearing members 29–32 welded or otherwise secured to the inner surface of one of the tweezer blade members, for example blade 2a (FIG. 10). Thus bearings 29 and 30 support actuating rod 13b and bearings 31 and 32 support 13c. Bearings 29 and 31 are located near the outer end of the tweezers and sufficiently close to the knives 10b and 10c to maintain these knives in close sliding engagement with the edge surfaces of both tweezer blades 1a and 2a.

The actuating rods 13a and 13b are secured in threaded engagement to the knife members 10b and 10c respectively by rotating the rods by their knurled knobs 28a and 28b. A single spring lever 16a on one side of the tweezers is employed to operate rod 13c to cause knife 10c to sever the suture, and a similar but oppositely placed spring lever 17 operates rod 13b and knife 10b. These spring levers are pivoted at 33 at a greater distance from the butt end of the tweezers than previously described in connection with FIGS. 1 and 6. This enables the cutting operation to be controlled between the thumb and first finger as shown more particularly in FIG. 11, instead of by the middle finger and palm as in the device of FIGS. 1 and 6.

Spring finger 17 is pivoted at 25a to a yoke 26a on rod 13b, and spring lever 16a is pivoted at 25b to a similar yoke 26c on rod 13c. These yokes press against collars pinned to the respective rods as shown. Auxiliary retracting springs 24a may be included if desired.

In FIG. 14 a modified form of tweezer blade and knife holder are indicated which may be used with the suture extractor of FIGS. 10–13.

Tweezer blades 1b and 2b are provided with flutings 34 on their outer surfaces, and the knives 10d and 10e are arranged with holders 35 and 36 respectively which have concave interior surfaces to engage the flutings 34 in slidable relation therewith. This construction maintains the knives in somewhat closer sliding engagement with the edge surfaces of the blade members than is accomplished by the mountings 29 and 31 for the actuating rods 13b and 13c (FIG. 10). The inner edges of the knife holders 35 and 36 slide in the valleys between the flutings 34 and provide a precise means for maintaining the knives in correct cutting position.

In reference to the modified form of the invention shown in FIGS. 15–19 the tweezer construction is similar to that of FIGS. 6 and 10 having tweezer blades 1a and 2a constructed and secured together as previously described. Also the knife 10b is identical with knife 10b shown and described in connection with FIG. 10 and its mounting is threadedly engaged by outer end of an actuating rod 13d. This rod slides in bearings 37 and 38 which are secured to one of the tweezer blades, for example blade 1a. A collar 39 is secured to the outer end portion of rod 13d by means of a set screw 40 (FIG. 17), and a retracting spring 41 is arranged between bearing 38 and collar 39.

The knife 10b is actuated by means of a thumb piece 42 which is secured to the outer end of a flexible member 43 which is arranged within a curved guide 44 and coupled at its inner end to the rod 13d by means of a coupling member 45. Member 43 may be of flexible plastic or a Teleflex cable, or the like, and guide 44 directs member 43 through an angle of approximately 90° and is secured by welding or otherwise to tweezer blade 1a. The location of guide member 44 and thumb piece 42 lengthwise of the device may be arranged so that the knife blade can be operated by the index finger 46 for example, or it may be arranged to be operated by the middle finger 22 if desired.

In the embodiment of the invention shown in FIGS. 20–23 the tweezers device takes a somewhat different form from those described previously. The tweezer blades 47 and 48 are welded together at their butt ends as indicated at 49, the former blade being straight and the latter curved outwardly as shown in FIG. 21 to provide a protuberance 50 to be engaged by the index finger 46 for manipulating the tweezers to grasp the suture. At their operating ends tweezer blades 47 and 48 are provided with narrow jaws 51 and 52 which may be square in end view as shown in FIG. 22.

The knife 53 has an angular cutting edge as shown in FIG. 21 and is provided with a holder 54 which slides on the upper portion of jaw 51. Holder 54 has an extension 55 into which the outer end of the actuating rod 13e is threadedly connected. Rod 13e slides in two bearings 56 which are secured to the outer surface of blade 47. The thumb piece 57 is secured to the butt end of operating rod 13a. A retracting spring 58 is arranged between thumb piece 57 and the adjacent bearing 56.

This form of the device is adapted to be grasped by the hand and the tweezers operated by the index finger (FIG. 21) while the cutting knife is operated by the end of the thumb.

The modification shown in FIGS. 24–25 is a variation of the modification shown in FIGS. 20–23, the difference being that the narrow jaws 51a and 52a are slotted as indicated at 59, and the knife blade 53a operates within this slot instead of sliding along the sides of the two jaws as in the form shown in FIGS. 20–23. The shank 60 of blade 53a is longer than in the case of blade 53, but otherwise the mounting including extension 55a, and the operating of the blade by actuating rod 13e is the same.

In the modification shown in FIGS. 27 and 28 the suture extracting device is in the form of a long slender arm which is made in two sections, an outer section 61 which is square in cross-section and a rod-like section 62 constituting the handle. At the outer end of square section 61 there is a recess forming a hook portion 63 having a rounded end portion 64 when viewed from the side and in line with the suture to be extracted. Jaw 63 has a side extension 65 on one side to be referred to presently.

The knife 66 is formed as a projection on the outer end of a short tubular member 67 which is arranged to slide on the exterior square surface of the outer section 61. Tubular member 67 and its knife 66 are slidingly actuated by means of an operating tube 68 which also slides on the outer square surface of section 61. The two parts are connected together by a joint 69 and a sleeve 70 so that a disposable knife 66 can be used if desired.

The opposite end 71 of tubular member 68 is closed as indicated at 71 and within this tube there is a coil compression spring 72 which surrounds the rod-like section 62 of the device. Spring 72 is a retracting spring and serves to urge the operating tube 68 towards the butt end of the device and against a stop pin 73.

In operating this device the rod-like section 62 is grasped with the hand and the hook 63 is engaged beneath the suture, this form of the device being particularly useful when the suture is in a deep location. After engaging the suture thumb pressure is employed to slide the tubular member 68 forward thus carrying knife 66 into cutting engagement with the suture and immediately thereafter closing the rear portion of the shoulder 74 formed on the inner end of knife holder 67 against the upper surface of suture portion 7 to be removed, pressing it against the upper edge of side extension 65 thereby gripping the suture and enabling it to be removed.

Referring now to the modification shown in FIGS. 29–33 this suture remover comprises a more or less rigid tweezer blade 75 and a flexible blade 76, the two being secured together at their butt ends by means of the usual screw and dowel pin arrangement illustrated. The outer ends of these two members form the jaws for grasping the suture. A third blade-like member 77 overlies blade member 76, and is somewhat shorter than the other two blade members and also somewhat stiffer. Its lower end is welded at 78 to a curved plate spring 79, the lower end 80 of which is welded to the adjacent tweezer blade 76. The upper end portion 81 of spring 79 engages and slides somewhat on the outer surface of blade 76. Member 77 is somewhat narrower than the other two blades but is stiff. A knife 82 projects from the left side of member 77 near its end and in position to engage the suture.

In operation, this device is grasped by the hand as shown in FIGS. 29 and 30 and the jaws are closed upon the suture, by a squeezing pressure between the fingers and palm which is transmitted from member 77 to blade 76 through the spring 79 which overcomes the resiliency of blade 76. Then additional pressure is applied by the thumb at a central position between the ends of member 77 which causes knife 82 to sever the suture so that the portion 7 thereof can be removed.

Knife 82 is shown in FIGS. 29–31 as being integral with the member 77. In FIGS. 32 and 33 a construction is shown wherein a disposable knife may be used. This knife which is indicated at 82a has a supporting member or holder 83 having a lengthwise recess 84 which is constructed to telescope over the outer end portion of member 77a and make a friction fit therewith so as to be retained securely in position. As indicated in FIG. 32 the outer end of member 77a may be rounded to a semi-circular form, and the holder 83 and its recess similarly formed.

I claim:

1. An instrument for removing sutures comprising a tweezer-like device adapted to be grasped by the hand having two cooperating blades joined to one another at the inner end portion of each blade and resiliently spaced apart at the outer end portions and operable to grip a suture between said outer end portions, a knife secured in sliding engagement with at least one side of the blades and being arranged to span the gripping portions of the blades when closed upon a suture, and means for actuating said knife to cause it to slide forward and sever the suture held by the tweezer blades.

2. An instrument for removing sutures comprising a tweezer-like device and adapted to be grasped by the hand having two cooperating blades joined to one another at the inner end portion of each blade and resiliently spaced apart at the outer end portions and operable to grip a suture between said outer end portions, a knife slidably engaging at least one side of the blades to sever the suture, an actuating rod connected at its outer end to said knife and mounted for sliding lengthwise movement on one of said tweezer blades and means for manually operating said rod.

3. An instrument for removing sutures as set forth in claim 2 in which the actuating rod is slidable in bearings mounted on one of the tweezer blades and the knife is supported on said rod closely adjacent to one side of the blades.

4. An instrument for removing sutures as set forth in claim 2 in which the actuating rod is provided at its outer end with an operating thumb piece for operating the rod.

5. An instrument for removing sutures as set forth in claim 2 in which the means for operating the actuating rod comprises a spring lever having a central resilient portion and rigid end portions projecting angularly and symmetrically from the central portion, one end portion being pivoted to the instrument and the opposite end portion being pivotally connected to the rod, said central portion projecting beyond one side of said cooperating blades so as to be operable by manual squeezing pressure during the manipulation of the instrument.

6. An instrument for removing sutures as set forth in claim 5 wherein a second spring lever similar to the first and similarly connected is arranged in symmetrical relation thereto and projects beyond the opposite side of said cooperating blades.

7. An instrument for removing sutures as set forth in claim 5 in which a second knife slidably engages the opposite side of the blades from the first knife and a second actuating rod is connected at its outer end to such second knife and mounted for sliding movement lengthwise of the second tweezers blade, and a second manually operated means being provided for actuating said second rod.

8. An instrument for removing sutures as set forth in claim 2 in which the means for operating the actuating rod comprises a slender flexible member connected at its outer end to said rod and having a thumb piece at its opposite end, and a curved guide for the flexible member fixed to one of the tweezers blades and extending through an arc approaching 90° so that lateral pressure on the thumb piece operates the actuating rod.

9. An instrument for removing sutures comprising a tweezer-like device adapted to be grasped by the hand having two cooperating blades joined to one another at the inner end portion of each blade and resiliently spaced apart at the outer end portions and operable to grip a suture between said outer end portions, a knife holder mounted for sliding movement on the device and including a knife arranged to span the gripping portions of the blades and in engagement with one side thereof when closed upon a suture, and means operable by the hand which grasps the device for moving the knife holder outward to cause the knife to sever the suture held by the tweezer blades.

10. An instrument for removing sutures as set forth in claim 9 in which the knife holder slidably embraces one of the tweezer blades at the outer portion thereof.

References Cited

UNITED STATES PATENTS

| | | | |
|---|---|---|---|
| 605,400 | 6/1898 | Crockett | 30—135 |
| 2,819,521 | 1/1958 | Parker | 30—135 |
| 3,054,182 | 9/1962 | Whitton | 128—305 X |

WILLIAM FELDMAN, *Primary Examiner.*

R. V. PARKER, Jr., *Assistant Examiner.*